United States Patent [19]

Robinson

[11] Patent Number: 5,323,310

[45] Date of Patent: Jun. 21, 1994

[54] ANALYSING TEXTUAL DOCUMENTS

[75] Inventor: David W. C. Robinson, Chipping Barnet, United Kingdom

[73] Assignee: The British and Foreign Bible Society, Stonehill Green, United Kingdom

[21] Appl. No.: 830,027

[22] Filed: Jan. 31, 1992

[30] Foreign Application Priority Data

Feb. 14, 1991 [GB] United Kingdom ............... 9103080

[51] Int. Cl.$^5$ ............................................. G06F 15/38
[52] U.S. Cl. ........................... 364/419.02; 364/419.05; 364/226.4
[58] Field of Search ............... 364/419, 419.02, 419.05

[56] References Cited

U.S. PATENT DOCUMENTS

| | | | |
|---|---|---|---|
| 4,381,551 | 4/1983 | Kanou, et al. | 364/419.07 |
| 4,599,612 | 7/1986 | Kaji, et al. | 345/115 |
| 4,672,539 | 6/1987 | Goertzel | 395/375 |
| 4,791,587 | 12/1988 | M. Doi | 364/419.02 |
| 4,805,132 | 2/1989 | Okamoto, et al. | 364/419.03 |
| 4,829,580 | 5/1989 | Church | 381/52 |
| 4,849,898 | 7/1989 | T. Adi | 364/419.1 |
| 4,852,173 | 7/1989 | Bahl, et al. | 381/43 |
| 4,864,502 | 9/1989 | Kucera, et al. | 364/419.08 |
| 4,868,750 | 9/1989 | Kucera, et al. | 364/419 |
| 4,994,967 | 2/1991 | S. Asakawa | 364/419.08 |

FOREIGN PATENT DOCUMENTS

| | | |
|---|---|---|
| 0335710 | 10/1989 | European Pat. Off. . |
| 0357370 | 3/1990 | European Pat. Off. . |
| 0366142 | 5/1990 | European Pat. Off. . |
| 0370774 | 5/1990 | European Pat. Off. . |
| 0424032 | 11/1990 | European Pat. Off. . |
| 0021956 | 3/1984 | France . |
| 35270 | 4/1981 | Japan . |
| 117039 | 7/1983 | Japan . |
| 163161 | 8/1985 | Japan . |
| 272866 | 12/1986 | Japan . |
| 78679 | 10/1987 | Japan . |
| 286173 | 12/1987 | Japan . |
| 44276 | 2/1988 | Japan . |
| 153669 | 6/1988 | Japan . |
| 138662 | 5/1990 | Japan . |
| 2193362 | 2/1988 | United Kingdom . |
| 2199680 | 7/1988 | United Kingdom . |
| 2177525 | 1/1989 | United Kingdom . |

OTHER PUBLICATIONS

*Angewandte Informatik*, vol. 31, No. 4, Apr. 1989, Wiesbaden DE, pp. 159-167. B. Teufel, "VISIR-ein Prototyp zum Vergleich von Texten" (abstract in English, remainder of document in German).

*Primary Examiner*—Roy N. Envall, Jr.
*Assistant Examiner*—Gita Shingala
*Attorney, Agent, or Firm*—Merchant, Gould, Smith, Edell, Welter & Schmidt

[57] ABSTRACT

Two text documents, one of which is a (possibly erroneous) translation of the other are stored in the memory of a text processing system. The distributions and forms of words within the documents are compared and by a statistical process it is determined which words are likely to be correctly translated. A list of those words which seem to have been inconsistently translated is compiled.

5 Claims, 9 Drawing Sheets

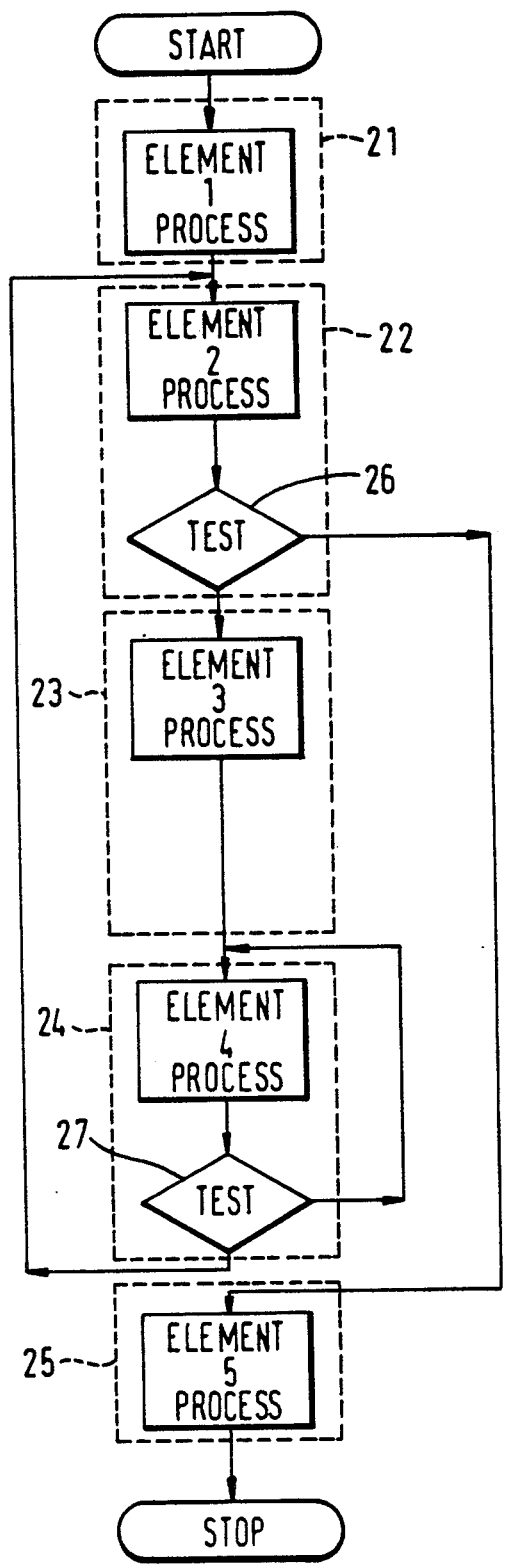

FIG. 10 $$P_1(H)(x,y) = \frac{m(x,y)^2}{T_y \cdot (|s_x - T_y| + 1)^{1/2}}$$

FIG. 11 $$r_1(H)(x, y_2^l) = \frac{P_1(H)(x, y^l)}{P_1(H)(x, y^{ll})}$$

FIG. 12 $$p_2(H)(x^*, q) = \frac{m(x^*, q)^2 + (\frac{L^2 + L}{2})}{T_y \cdot (|s_x^* - Tq| + 1)^{1/2}}$$

FIG. 13 $$p_3(H)(x^*, y) = \frac{m(x^*, y)^2 + (\frac{L^2 + L}{2}) + f_1 + f_2}{T_y \cdot (|s_x^* - T_y| + 1)^{1/2}}$$

ANALYSING TEXTUAL DOCUMENTS

This invention relates to the analysis of textual documents, for example to testing the accuracy of a translation of a document.

To test the accuracy of a first document, written in a first language, as a translation of a second document, written in a second language, it has been necessary to scan each document and, using a dictionary, to compare the texts. This is, of course, extremely time-consuming and has presented difficulties if the dictionary does not include some of the words the text, as is often the case when testing large or specialised documents; if the dictionary does not give all the required synonyms of a word; or if a relevant dictionary had not been compiled or was unavailable, as is still the case for many languages, e.g. Qetchua and Chichewa.

It is an object of the present invention that translations between two written languages may be compared, without requiring any specific knowledge of either language. This makes it particularly suitable for application to documents written in uncommon languages.

It is a second object of the present invention that the basis of a dictionary showing the correspondence of words between two languages may be compiled from analysis of one or more documents written in both of the languages.

According to the present invention, there is provided a method of processing a first text document and a second text document, each of the documents being divided into segments and stored in memory means of a text processing system, the segments being further divided into words, the method comprising carrying out the steps of:

a) selecting a word in the first text document and a word in the second text document and determining a representation of the probability that the two words have substantially the same meaning by taking into account the result of a comparison of the distribution of words in the segments of the first text document and the second text document; and b) regarding two words for which the representation of the probability that they have substantially the same meaning is greater than a threshold to be words having substantially the same meaning.

The invention will now be described, by way of example, with reference to the accompanying drawings, in which:

FIGS. 4, 5, 6, 7, 8 and 9 are flow diagrams illustrating an example of a method according to the invention;

FIGS. 10, 11, 12 and 13 show equations used during the operation of an example of the method.

Figure 1:
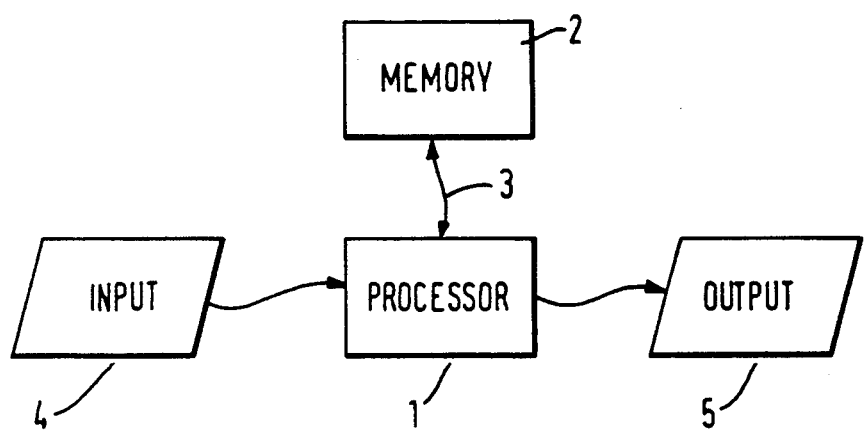
FIG. 1 is a block diagram of a system to which the invention is applicable.

The components of the system shown in FIG. 1 are: a processor 1 which is in two-way communication with a random access memory 2 along a bus 3; an input unit 4 which may, for instance, be a keyboard; and an output unit 5 which is also connected to the processor 1 and may, for instance, be a CRT.

The example of the method comprises storing two textual documents in the memory 2, one of which is a (possibly erroneous) translation of the other; comparing the distributions and forms of words within the documents; determining by a statistical process which words are likely to be correctly translated and compiling a list of those which seem to have been inconsistently translated. The list may then be assessed by a linguist who might correct any errors in the translation. Words which have been correctly translated may be paired with their translated equivalents and the pairs thus formed may be used as the basis of a bilingual dictionary. It should be noted that the method will not determine as having been incorrectly translated any words which are systematically mistranslated at every one of their occurrences.

The example of the method will now be described in more detail and, for ease of explanation but by way of example only, will be described as a series of five Elements which are labelled 21, 22, 23, 24 and 25 in FIG. 4 (which shows, generally, the relationships between these Elements). FIGS. 5, 6, 7, 8 and 9 illustrate in more detail the steps included in each Element 21, 22, 23, 24 and 25 respectively and, for clarity, two steps of the example of the method are labelled 26 and 27 in FIGS. 4, 6 and 8.

ELEMENT 1

Figure 2:
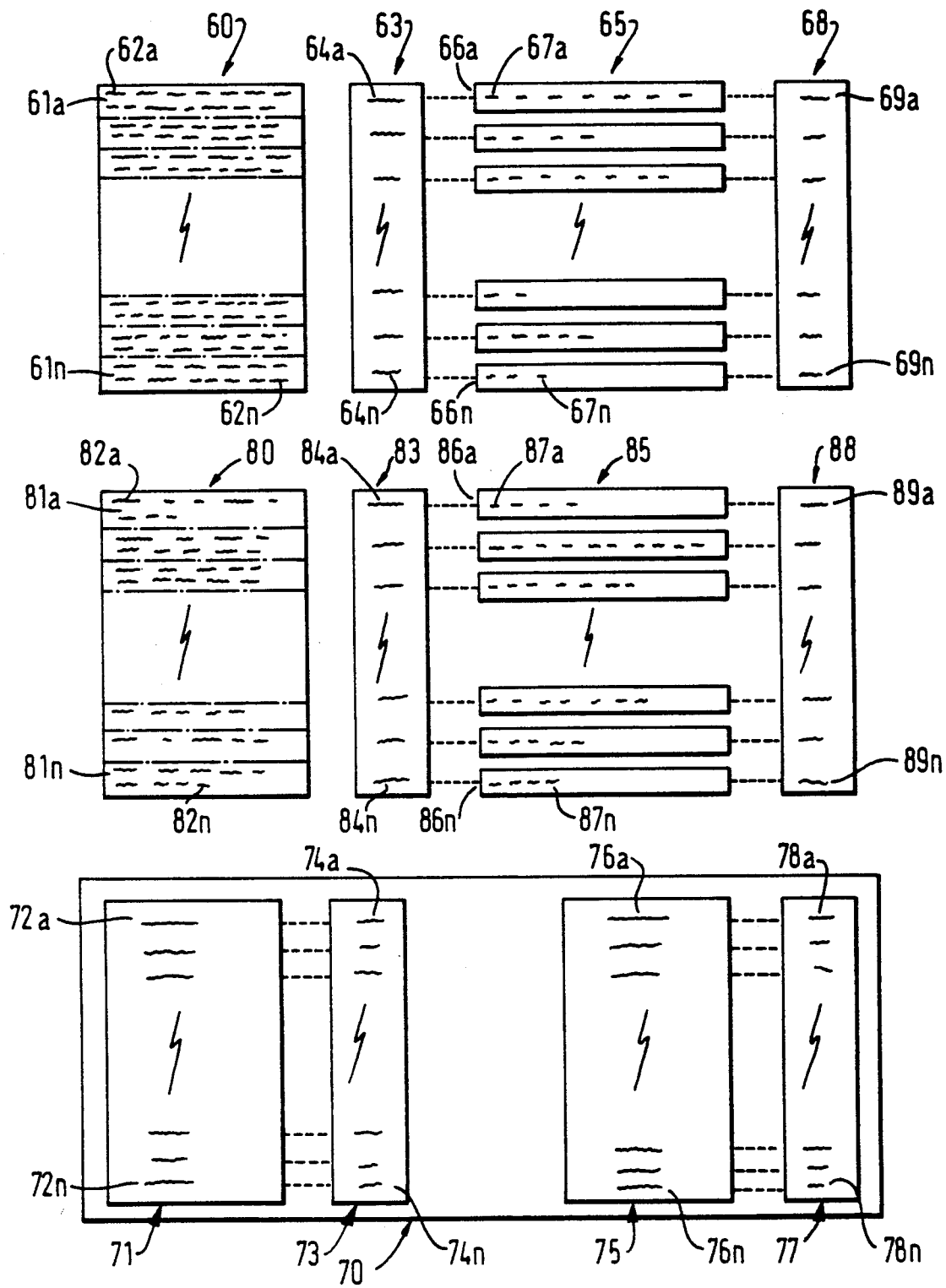
FIG. 2 illustrates an example of the make-up of a first portion of the memory block shown in FIG. 1.
Figure 5:
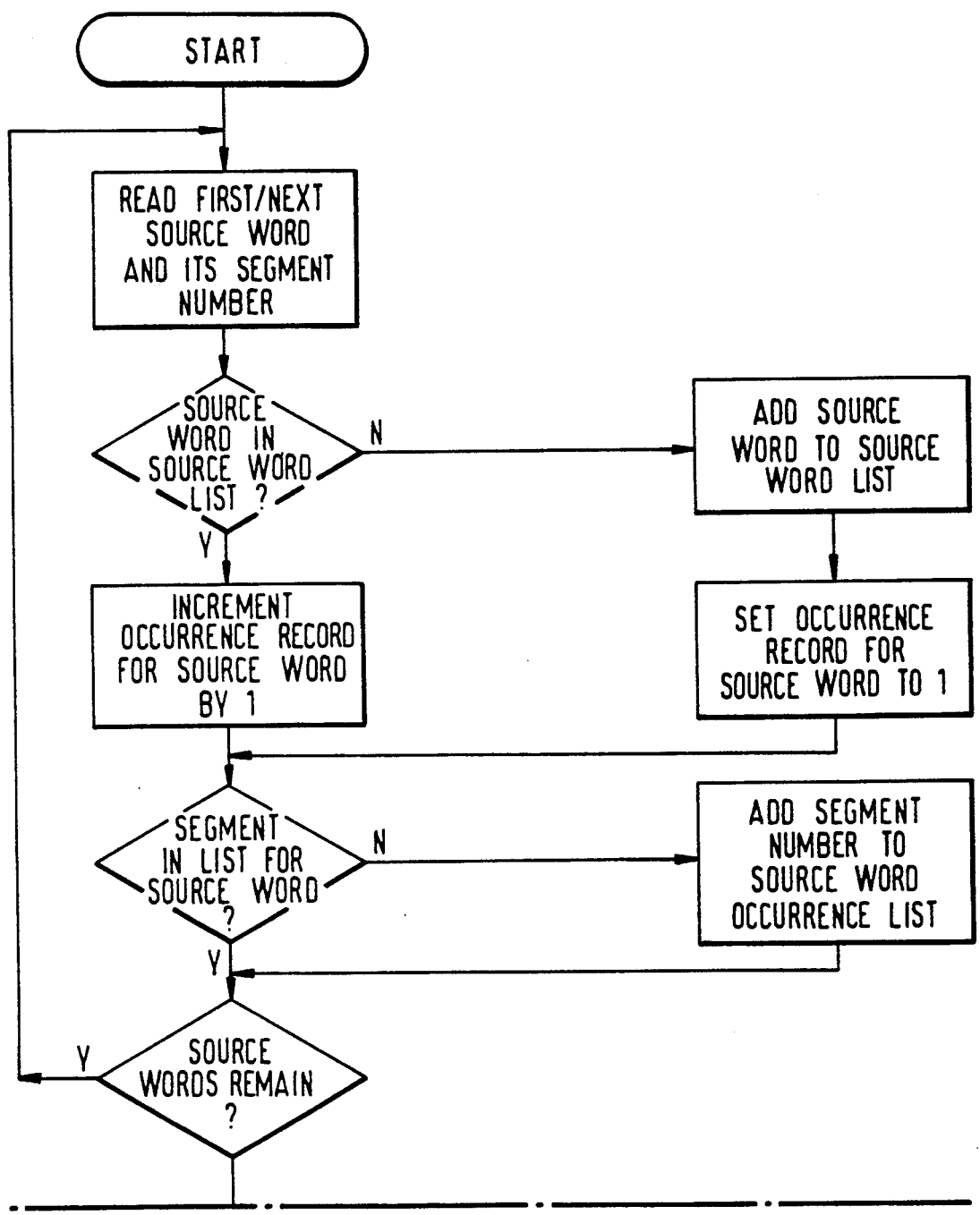
Figure 5:
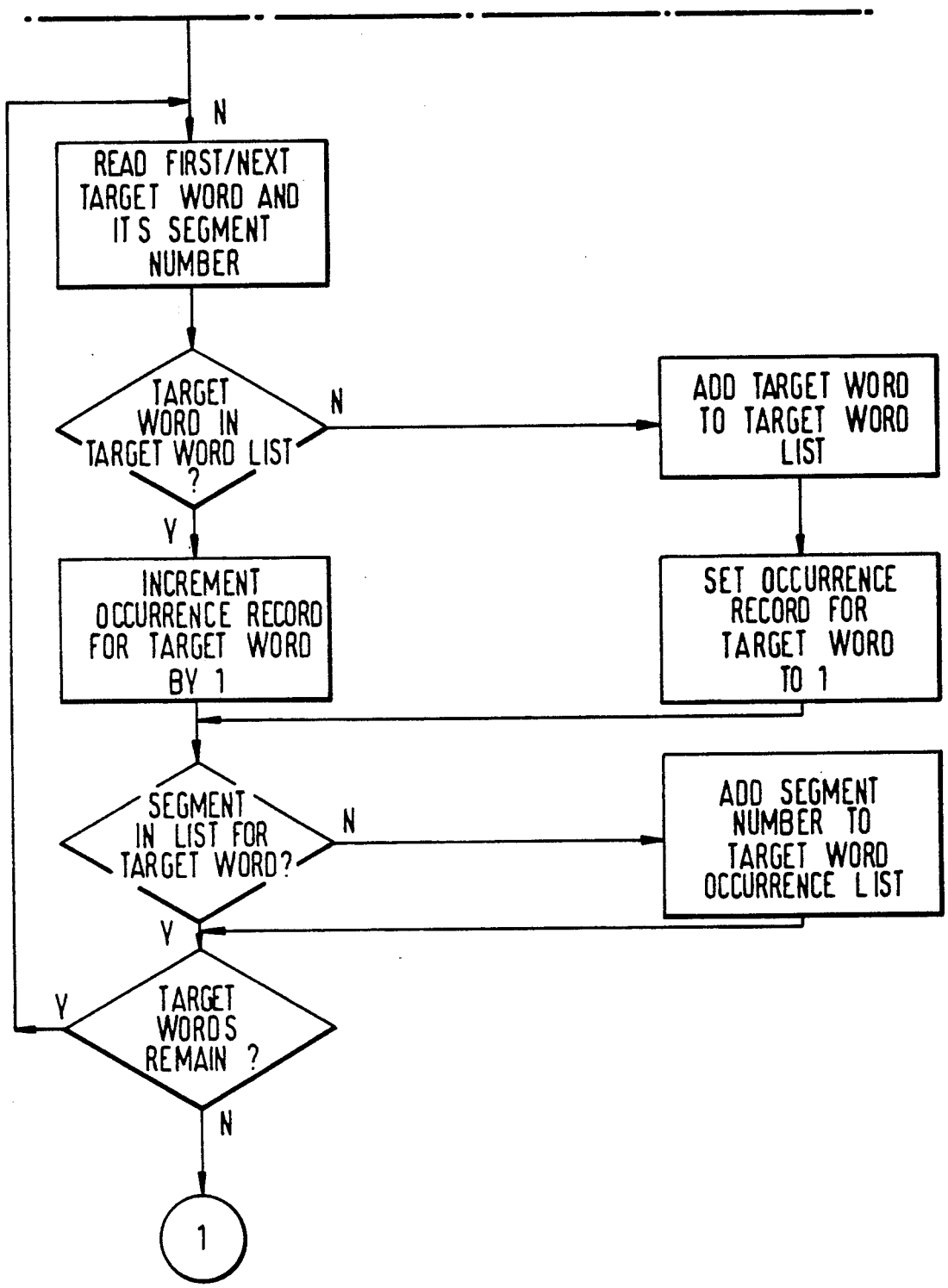
Figure 6:
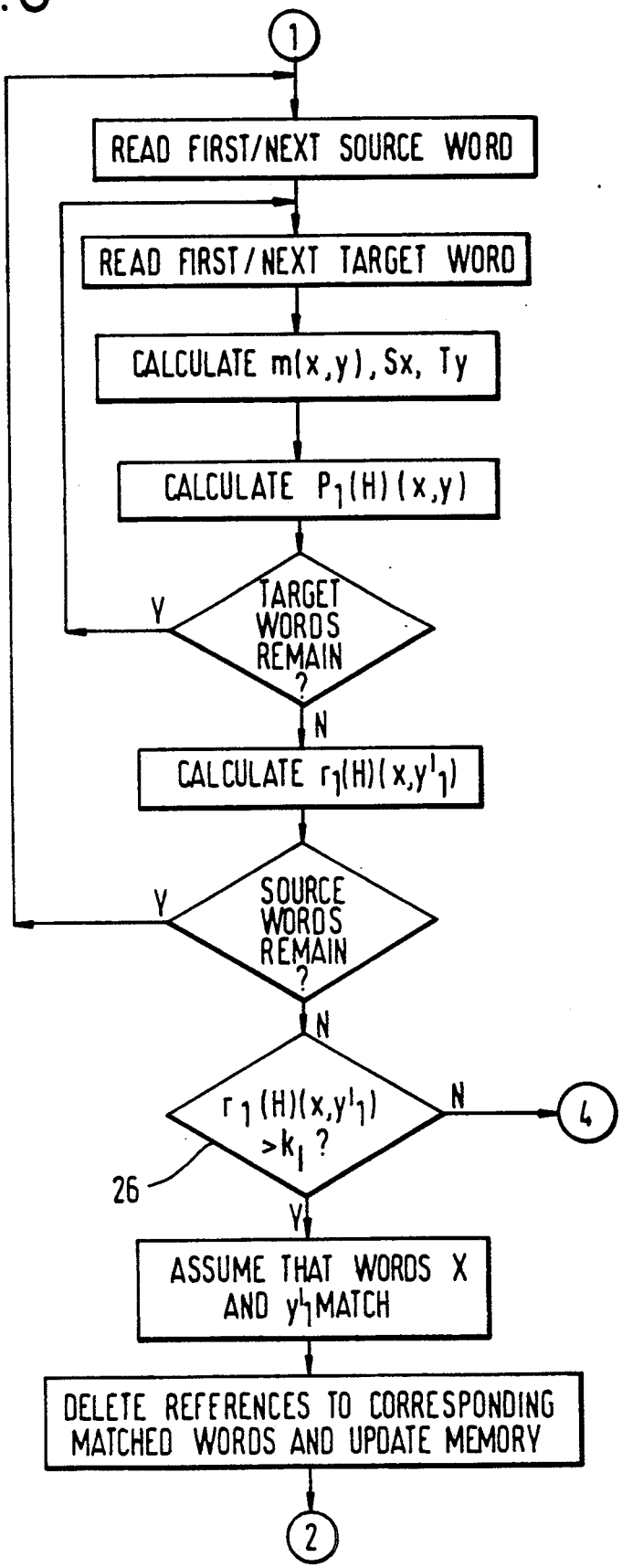
Figure 7:
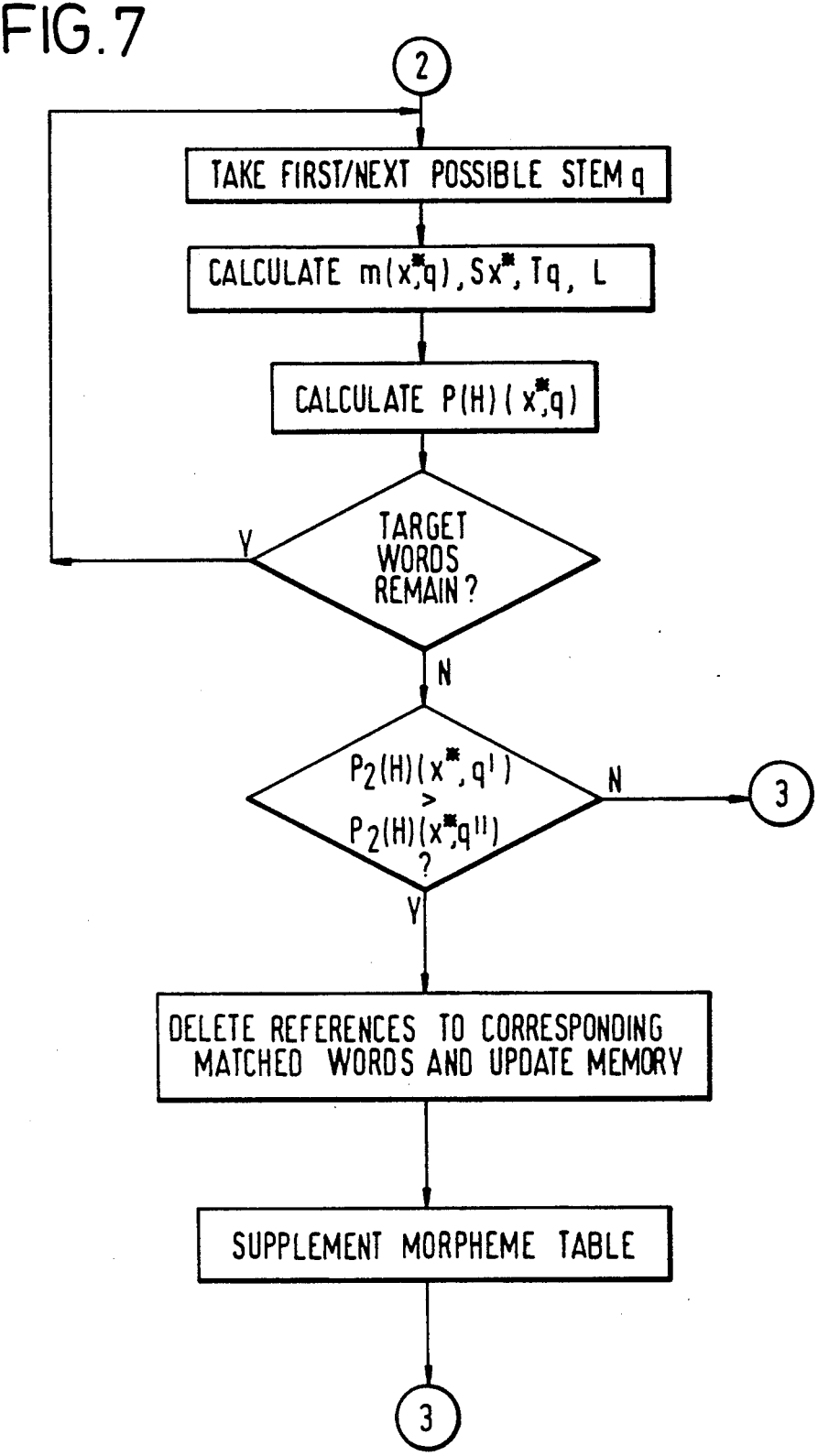
Figure 8:
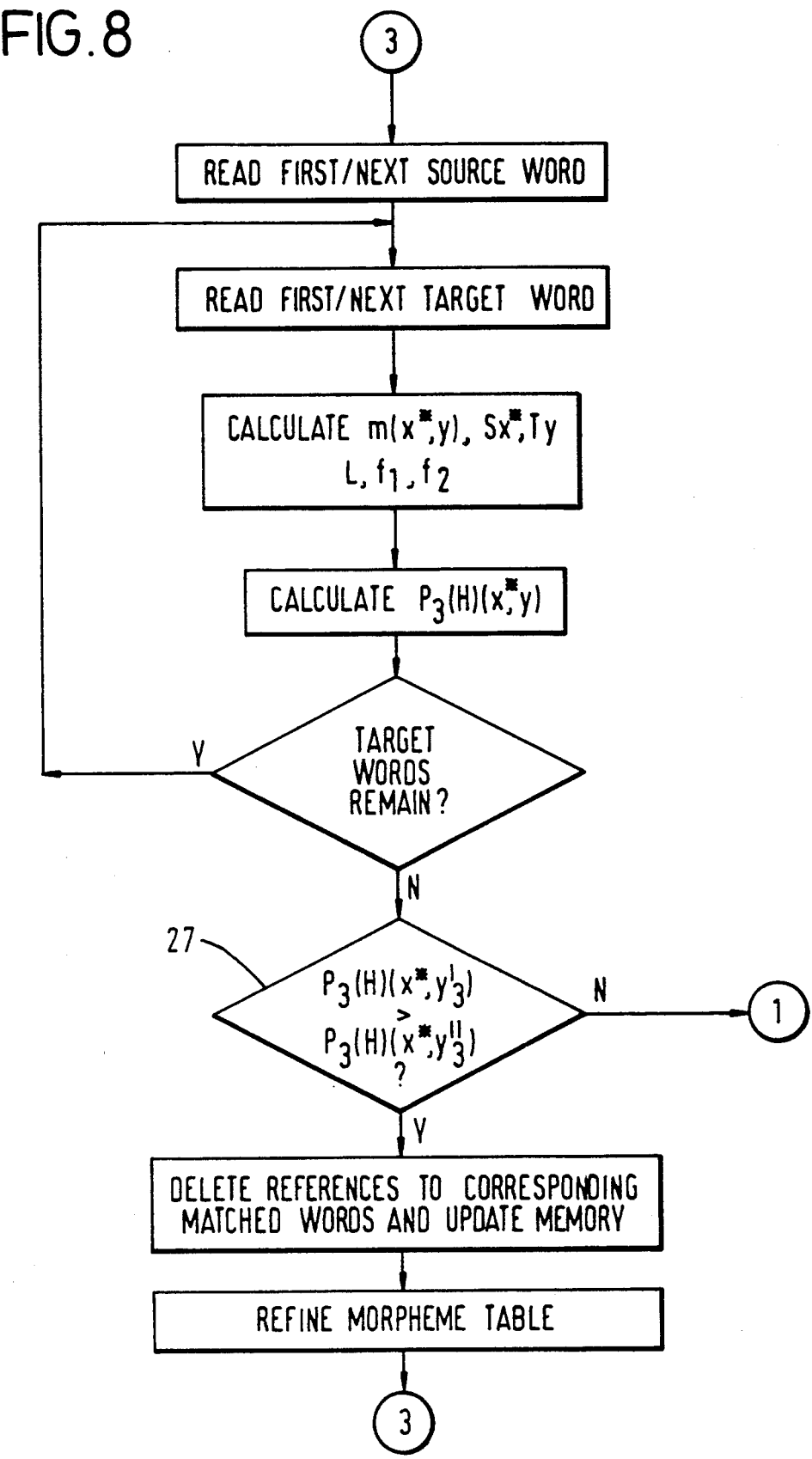
Figure 9:
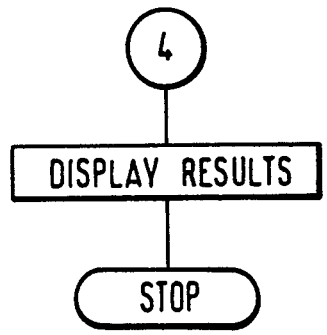

Referring to FIGS. 1 and 2, a source document 60 and a target document 80 are held in the memory 2. If the example of the method is to be used to search for likely errors in a translation, one of the two documents should be a copy of the original text and the other a copy of the translated text. In the description below, reference numerals between 60 and 69 refer to features related to the source document 60 and reference numerals between 80 and 89 refer to features related to the target document 80.

The first stage of the example of the method is to tabulate the positions of words within each document. The two documents are divided into numbered segments 61$a$–$n$ and 81$a$–$n$, each containing a number of words 62$m$–$z$ and 82$a$–$n$, in such a way that each segment 61$a$–$n$ may be paired with one corresponding segment 81$a$–$n$ which, if the translation has been accurately performed, would have substantially the same meaning. Therefore, if the translation between the two documents has been accurately performed, it may often be the case that a word in a particular segment of one document will represent a translation of one of the words in the corresponding segment of the other document. For example, if one segment (written in English) were "THE CAT IS BLACK" and its corresponding segment (in French) were "LE CHAT EST NOIR" then the pairs of words: "THE" and "LE"; "CAT" and "CHAT"; "IS" and "EST"; and "BLACK" and "NOIR" are pairs containing words which represent translations of each other.

To illustrate the method, reference will be made to the textual documents shown in Tables 1 and 2 below which represent substantially the same text; the document in Table 1 being written in English and the document in Table 2 being a translation of the document in Table 1 into Chichewa. The document in Table 1 will represent a source document and the document in Table 2 will represent a target document. Both of these documents are broken into segments numbered from 1 to 10 so that corresponding segments (1 and 1, 2 and 2, etc.) would represent the same section of text if the translation has been accurately performed. It should be noted that the method is not restricted to use with languages which are written in the alphabetic characters which may be available for display on the system to which the example of the method is being applied: any non-standard characters may be replaced with other symbols or combinations of symbols—for example the "=" character used in the segment numbered 5 in the document in Table 2 which, in that document, represents a circumflex over the preceding character. Such symbols or combinations of symbols are treated as if they were alphabetic characters.

TABLE 1

(1) This is the Good News about Jesus Christ, the Son of God.

(2) It began as the prophet Isaiah had written: "God said, 'I will send my messenger ahead of you to clear the way for you.'

(3) Someone is shouting in the desert, 'Get the road ready for the Lord; make a straight path for him to travel!'".

(4) So John appeared in the desert, baptizing and preaching. "Turn away from your sins and be baptized", he told the people, "and God will forgive your sins.

(5) Many people from the province of Judaea and the city of Jerusalem went out to hear John. They confessed their sins, and he baptized them in the River Jordan.

(6) John wore clothes made of camel's hair, with a leather belt round his waist, and his food was locusts and wild honey.

(7) He announced to the people, "The man who will come after me is much greater than I am. I am not good enough even to bend down and untie his sandals.

(8) I baptize you with water, but he will baptize you with the Holy Spirit."

(9) Not long afterwards Jesus came from Nazareth in the province of Galilee, and was baptized by John in the Jordan.

(10) As soon as Jesus came up out of the water, he saw heaven opening and the Spirit coming down on him like a dove.

TABLE 2

(1) Uwu ndi Uthelga Wabwino wonena za Yesu Kristu, Mwana wa Mulungu.

(2) Unayamba monga mneneri Yesaya analemba m'buku mwake kuti, Mulungu akuti, Siyi nthumwi yanga. Ndiituma m'tsogolo mwako kuti ikakonzeretu za kufika kwako.

(3) Munthu akupfuula m'chipululu, alikunena kut, Konzani msewu woderzeramo Ambuye, ongolani njira zoti apitemo.

(4) Zimenezi zinachitikadi pamene Yohane Mbatizi anafika kuchipululu, nayamba kulalika. Ankauza anthu kuti, Lapani, batizidwani, ndipo Mulungu adzakhululukira machimo anu.

(5) Anthu a m'dera lonse la Yudea, ndi a ku Yerusalemu omwe, analikubwera kwa iye. Ndipo iwo ataulula machimo awo, iye anka=wabatiza mumtsinje wa Yordane.

(6) Yohaneyo, chobvala chake chinall chaubweya wa nyama yina yotchedwa ngamila. M'chiuno ankamangira lamba wachikopa, ndipo zakudya zake zinali dzombe ndi uchi.

(7) Kulalika kwake ankati, Pambuyo panga pakubwera wina wamphamyu kuposa ine. Ndine wosayenera ngakhale ku=werama ndi kumasula zingwe za nsapato zake.

(8) Ine ndimakubatizani ndi madzi chabe, korea Iyeyo adzakubatizani ndi Mzimu Woyera.

(9) Pamasiku amenewo Yesu anafika kuchokera ku Nazarete, mudzi wa ku Galllea, ndipo Yohane anambatiza mumtsinje wa Yordane.

(10) Pobvuuka m'madzimo, anangoona kuthambo kulikutsekuka, ndipo Mzimu Woyera, wooneka ngati nkhunda, akutsika pa Iye.

Throughout the operation of the method, upper and lower-case characters are treated identically; thus the word "Apple" is treated as being completely equivalent to the word "apple". Words are considered to be delimited by spaces but any non-alphabetic characters (for example punctuation) occurring before the first alphabetic character in a word or after the last alphabetic character in a word are ignored. Therefore, the passage "TWENTY-FOUR (MEN'S DOGS' COLLARS)" would be treated as being composed of the words: "TWENTY-FOUR", "MEN'S" "DOGS", and "COLLARS".

Referring again to FIG. 2, a source word list 63, a source word occurrence set 65 and a source word frequency list 68 are compiled in relation to the source document 60. The source word list 63 is a list of words 64a-n, these words being all the unique word forms in the source document 60, with each distinct word being included once only. The source word occurrence set 65 is a set of source word occurrence lists 66a-n which are lists of segment numbers 67aa-nn, each source word occurrence list 66a-n corresponding to one of the words 64a-n and being a list of the numbers of the segments 61a-n in which that word 64a-n occurs.

A segment number is included only once in a particular source word occurrence list 66a-n even if the word 64a-n to which it relates occurs more than once in the segment 61 a-n having that number. The source word frequency list 68 is a list of records 69a-n, each record 69a-n corresponding to one of the words 64a-n and being a record of the number of times that that word 64a-n has been found to occur in the source document 60.

The source word list 63, the source word occurrence set 65 and the source word frequency list 68 may be compiled by taking each word 62m-z in each segment 61a-n in turn, searching for it in the source word list 63; appending it to the source word list 63 if it is not found there; incrementing the record 69a-n corresponding to the word (or setting that record to 1 if the word had not previously been found) and appending the number of the segment 61a-n in which the word has been found to the source word occurrence list previously been found in that segment.

To illustrate the process described in the two preceding paragraphs, Table 3 below shows portions of the source word list, the source word frequency list and the source word occurrence set which would be complied for the document in Table 1. The word "SINS", for example, occurs in the segments numbered 4 and 5 in Table 1, therefore the numbers 4 and 5 are listed in the source word occurrence list corresponding to the word "SINS". It should be noted that although the word "SINS" occurs twice in the segment numbered 4 its occurrence in that segment is recorded only once in the source word occurrence list corresponding to the word "SINS".

TABLE 3

| Source Word List | Source Word Frequency list | Source Word Occurrence Set |     |     |     |     |
| --- | --- | --- | --- | --- | --- | --- |
| AWAY | 1 | 4 |   |   |   |   |
| FROM | 3 | 4 | 5 | 9 |   |   |
| YOUR | 1 | 4 |   |   |   |   |
| SINS | 3 | 4 | 5 |   |   |   |
| BE | 1 | 4 |   |   |   |   |
| BAPTIZED | 3 | 4 | 5 | 9 |   |   |
| HE | 5 | 4 | 5 | 7 | 8 | 10 |

Similarly, and again referring to FIG. 2, a target word list 83, a target word occurrence set 85 and a target word frequency list 88 are compiled in relation to the target document 80. The target word list 83 is a list of words 84a–n, these words being the distinct words in the target document 80, with each distinct word being included once only. The target word occurrence set 85 is a set of target word occurrence lists 86a–n which are lists of segment numbers 87aa–nn, each target word occurrence list 86a–n corresponding to one of the words 84a–n and being a list of the numbers of the segments 81a–n in which that word 84a–n occurs. A segment number is included only once in a particular target word occurrence list 86a–n even if the word 84a–n to which it relates occurs more than once in the segment 81a–n having that number. The target word frequency list is a list of records 89a–n, each record 89a–n corresponding to one of the words 84a–n and being a record of the number of times that that word 84a–n has been found to occur.

The target word list 83, the target word occurrence set 85 and the target word frequency list 88 may be complied by taking each word 82m–z in each segment 81a–n in turn, searching for it in the target word list 83; appending it to the target word list 83 if it is not found there; incrementing the record 89a–n corresponding to the word (or setting that record to 1 if the word had not previously been found) and appending the number of the segment 81a–n in which the word has been found to the target word occurrence list 86a–n corresponding to that word if the word had not previously been found in that segment.

Portions of the target word list, the target word frequency list and the target word occurrence set (which contains target word occurrence lists) which would be compiled for the document in Table 2 are shown in Table 4 below.

TABLE 4

| Target Word List | Target Word Frequency List | Target Word Occurrence List |     |     |     |     |
| --- | --- | --- | --- | --- | --- | --- |
| ANKAUZA | 1 | 4 |   |   |   |   |
| ANTHU | 2 | 4 | 5 |   |   |   |
| LAPANI | 1 | 4 |   |   |   |   |
| BATIZIDWANI | 1 | 4 |   |   |   |   |
| NDIPO | 5 | 4 | 5 | 6 | 9 | 10 |

The following three Elements of the process, in which the information tabulated as described above is used to gain an indication of words in the source document which might have substantially the same meaning as words in the target document, are carried out recursively, as is indicated in FIG. 4.

ELEMENT 2

To locate a pair of words, one from the source document 60 and one from the target document 80, which are particularly likely to "match", i.e. to have substantially the same meaning in the context in which they occur, an analysis is made of the source and target documents 60 and 80.

Each word 64a–n is taken in turn and is paired, in turn, with each word 84a–n which occurs in a segment which is included in the target word occurrence list 67aa–nn corresponding to that word 64a–n. For each pairing, for instance of a word from the source document designated x and a word from the target document designated y, the following values are determined:

m(x,y)—the number of times that the word x and the word y occur in corresponding segments 61a–n and 81a–n in the source and target documents 60 and 80 (this may be determined by a comparison of the lists of segment numbers 66a–n and 86a–n corresponding to each word);

$S_x$—the number of occurrences of the word x in the source document 60 that are as yet unmatched (this is stored in the record 69a–n corresponding to that word); and $T_y$—the number of occurrences of the word y in the target document 80 that are as yet unmatched (this is stored in the record 89a–n corresponding to that word);

and a provisional representation of the likelihood that the words x and y match, $p_1(H)(x,y)$, is calculated by using the equation shown in FIG. 10.

The form of this equation has been chosen so that—in general—the value of $p_1(H)(x,y)$ will tend to give an indication of the likelihood that the words x and y match; $p_1(H)(x,y)$ being—in general—greater the more likely it is that the words x and y do match. The value of $p_1(H)(x,y)$ calculated by using this equation will tend to increase if the distributions of the words x and y throughout the document are such that those words occur more frequently in the same segment as each other; or if the number of times that the words x and y occur in the same segment as each other is higher in comparison to the total number of times that they occur; but will tend to decrease if there is a greater difference between the total numbers of times that the words x and y occur in their respective documents.

Since, as described above, the value of $p_1(H)(x,y)$ calculated for a pair of words is taken to indicate the likelihood that those words match, the most likely word in the target document to match a particular word in the source document is taken to be that word in the target document which yielded the greatest value of $p_1(H)(x,y)$ when paired with the word from the source document.

For example, referring to the documents in Tables 1 and 2 and retaining the notation used above, if the word x (from the source document) were "IN" (which occurs in the segments numbered 3, 4, 5 and 9 in Table 1) and word y (from the target document) were "KUTI" (which occurs in the segments numbered 2, 3 and 4 in Table 2) then the number of times that the words x and y occur in corresponding segments (m(x,y)) is seen to be 2 (because both "IN" and "KUTI" occur in the segments numbered 3 and 4); the number of times that the word x occurs in the document in Table 1 ($S_x$) is seen to be 4 and the number of times that the word y occurs in the document in Table 2 ($T_y$) is seen to be 3. Therefore, for this pairing of words, $p_1(H)(x,y)=0.943$, using the equation shown in FIG. 10. The best values of $p_1(H)(x,y)$ found for pairings of the word "IN" from the document in Table 1 with other words from the document in Table 2 are shown in Table 5 below. The highest value of $p_1(H)(x,y)$: 1.273; relates to the case where word y is "NDIPO" and the second-highest value of $p_1(H)(x,y)$: 1.155; relates to the case where word y is, for example, "ANAFIKA". Hence "NDIPO" is assumed to be the most likely word in the document in Table 2 to match the word "IN".

TABLE 5

| y | M(x,y) | $S_x$ | $T_y$ | p(H) (x,y) |
|---|---|---|---|---|
| NDIPO | 3 | 4 | 5 | 1.273 |
| ANAFIKA | 2 | 4 | 2 | 1.155 |
| ANTHU | 2 | 4 | 2 | 1.155 |
| KU | 2 | 4 | 2 | 1.155 |
| MACHIMO | 2 | 4 | 2 | 1.155 |
| MUMTSINJE | 2 | 4 | 2 | 1.155 |
| YOHANE | 2 | 4 | 2 | 1.155 |
| YORDANE | 2 | 4 | 2 | 1.155 |
| WA | 2 | 4 | 4 | 1.000 |
| KUTI | 2 | 4 | 3 | 0.943 |

For each word 64a-n, the highest and the second-highest values of $p_1(H)(x,y)$ found for pairings including that word are stored, along with a record of the words in the target document which were included in the pairings for which those values were calculated. For a particular word x from the source document 60, these words are designated $y_1'$ and $y_1''$ respectively and the highest and second-highest values of $p_1(H)(x,y)$ are designated $p_1(H)(x,y_1')$ and $p_1(H)(x,y_1'')$ respectively. The word $y_1'$ is assumed to be the most likely word remaining in the target word list to match the word x.

To determine which pairing of a word from the source document and a word from the target document is the most likely of all such pairings to represent a match, the pairing for which the highest value of $p_1(H)(x,y)$ was calculated could be chosen. This would be a value of $p_1(H)(x,y_1')$ calculated for a pairing of a word x with its corresponding word $y_1'$. However, if the value of $p_1(H)(x,y_1'')$ calculated for the pairing of the same word x with its corresponding word $y_1''$ is close to that value of $p_1(H)(x,y_1')$ then it may be unclear whether the word x should be matched with the word $y_1'$ or with the word $y_1''$ (or perhaps with both). It has been found that it is preferable to assume that the most likely pair to be matched is that for which, for a particular word x, there is the greatest relative difference between $p_1(H)(x,y_1')$ and $p_1(H)(x,y_1'')$. So, for each word 64a-n, a revised representation of the likelihood that that word is a member of the pair which most probably represents a match, $r_1(H)(x,y_1')$ is calculated by using the equation shown in FIG. 11. The form of this equation results in $r_1(H)(x,y_1')$ being—in general—greater the more likely it is that a word x and its corresponding word $y_1'$ match.

After $r_1(H)(x,y_1')$ has been calculated for each of the words 64a-n, it is determined for which of those words the highest value of $r_1(H)(x,y_1')$ was calculated and this word is denoted x*.

If that highest value of $r_1(H)(x,y_1')$ is not greater than a certain value $k_1$ (which must be 1 or greater than 1) then it is assumed that no more words which match the word x* can be decided upon. Processing is therefore transferred to Element 5 which is described below.

Otherwise, the word $y_1'$, the word with which the word x* was paired to give the highest value of $p_1(H)(x,y)$, is assumed to match the word x* and is stored in a temporary match store 50. Because the word $y_1'$ is assumed to match the word x*, the word $y_1'$ need no-longer be included in processing directed to the finding of matches where its occurrence in the target document corresponds to an occurrence of word x* in the source document, i.e. where the lists of segment number 67aa-nn and 87aa-nn corresponding to the words x* and $y_1'$ both contain a particular segment number. Therefore, for the positions in the source document 60 and the target document 80 where such a correspondence occurs, the words x* and $y_1'$ which are in correspondence are deleted from the source word occurrence set 65 and from the target word occurrence set 85 and the source word list 63, the target word list 83, the source word frequency list 68 and the target word frequency list 88 are updated accordingly:

the value stored in the record 69a-n corresponding to the word x* is decremented by 1 for each word x* which is deleted;

if each occurrence of the word x* in a particular segment 61a-n has been found to correspond with a word from the target document then the number of that segment is deleted from the source word occurrence list 66a-n corresponding to the word x*;

if the value stored in the record 69a-n corresponding to the word x* is now zero then the word x* is deleted from the source word list 63;

the value stored in the record 89a-n corresponding to the word $y_1'$ is decremented by 1 for each word $y_1'$ which is deleted;

if each occurrence of the word $y_1'$ in a particular segment 81a-n has been found to correspond with a word from the source document then the number of that segment is deleted from the target word occurrence list 86a-n corresponding to the word $y_1'$; and if the value stored in the record 89a-n corresponding to the word $y_1'$ is now zero then the word $y_1'$ is deleted from the target word list 83.

Figure 3:
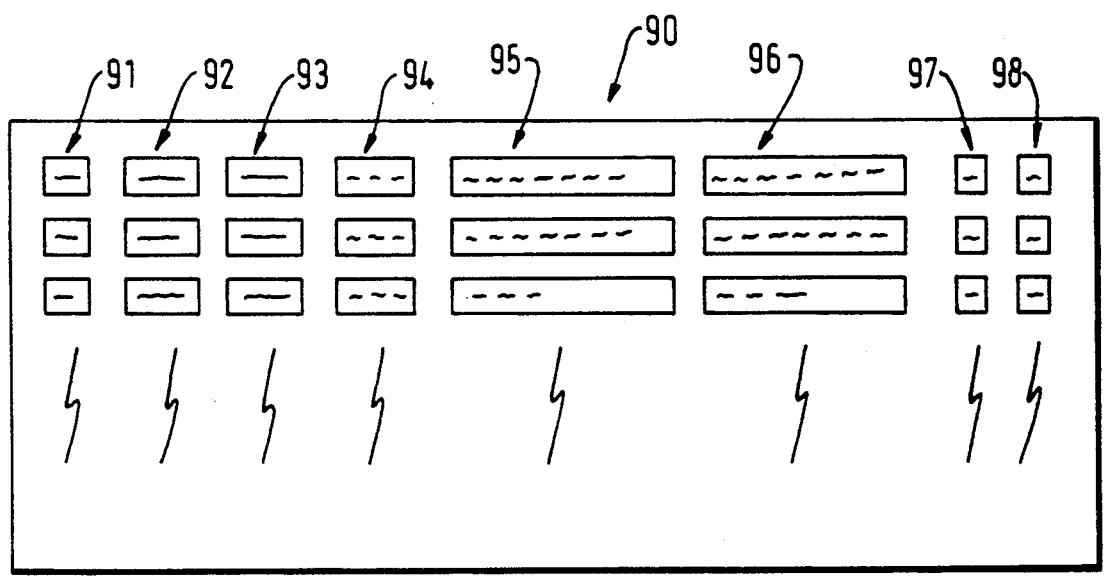
FIG. 3 illustrates an example of the make-up of a results table which is a second portion of the memory block shown in FIG. 1.

The results table 90 shown in FIG. 3 is also updated to take account of the newly located match by the addition of a row of data to that table, the row containing:

a serial number allotted to the present paring of words x* and $y_1'$ (stored in column 91);

the word x* (stored in column 92);

the word $y_1'$ (stored in column 93);

the parsing (i.e. the division into prefix, stem and suffix) currently assumed to apply to the word $y_1'$ (stored in column 94) (if Element 4 described below has not yet been processed then the word $y_1'$ will be assumed to have no prefix or suffix);

a list of the segments in the source document in which occurrences of the word x* have been found to match the word $y_1'$ (stored in column 95);

a list of the segments in the target document on which occurrences of the word x* have been found to match the word x* (stored in column 96);

the total number of matched pairs of words x* and $y_1'$ (stored in column 97); and a flag record indicating whether or not the parsing stored in column 94 of the present row has been updated, currently set so as to show that it has not been updated (stored in column 98).

Processing is then transferred to Element 3 in order that more words which match the word x* may be located.

ELEMENT 3

To locate more words which match the word $x^*$, use is made of the hypothesis that—in general—the longer is a group of consecutive letters common to two words, the more likely it is that those two words are "related" to each other and that those two words may thus be represented by the same word when translated. For example, a group of five consecutive letters is common to the related words "REMOULD", "MOULDED" and "MOULDS" and since those words are "related", it is possible that, when they are translated, the same word in the translation may represent each of these words. Similarly, the word "John" in the document in Table 1 is (correctly) translated in the document in Table 2 as "YOHANE" where it appears in the segment numbered 4 but as "YOHANEYO" where it appears in the segment numbered 6, and it will be noted that a group of six consecutive letters is common to "YOHANE" and "YOHANEYO". A group of consecutive letters which is located as being common to two words is assumed to be a stem and any group of characters before or after the stem in a word is assumed to be a prefix or a suffix respectively.

Referring again to FIG. 2, each set of letters which could represent a stem in the word $y_1'$ identified previously as the most likely match for $x^*$ and stored in the temporary match store 50 is taken in turn and the segment numbers 87$a$-$n$ in the target word occurrence lists 86$a$-$n$ of each remaining word 84$a$-$n$ which contains that stem are collected in a temporary stem occurrence store 51. For each such stem, designated q, the following values are determined:

$m(x^*,q)$—the number of times that the word $x^*$ and the remaining words 84$a$-$n$ containing q occur in corresponding segments 61$a$-$n$ and 81$a$-$n$ in the source and target documents 60 and 80 (this may be determined by a comparison of the list of segment numbers 66$a$-$n$ corresponding to word $x^*$ and the contents of the temporary stem occurrence store 51);

$S_x$—the number of occurrences of the word $x^*$ in the source document 60 that are as yet unmatched (this is stored in the record 69$a$-$n$ corresponding to word $x^*$);

$T_q$—the total number of occurrences of the words 84$a$-$n$ which contain the stem q in the target document 80 that are as yet unmatched;

L—the length of the stem q;

and a representation of the likelihood that the word $x^*$ and the words 84$a$-$n$ which contain the stem q match, $p_2(H)(x^*,q)$, is calculated by using the equation shown in FIG. 12.

The form of this equation has been chosen so that—in general—the value of $p_2(H)(x^*,q)$ will tend to give an indication of the likelihood that the words $x^*$ and the words 84$a$-$n$ which contain the stem q match; $p_2(H)(x^*,q)$ being—in general—greater the more likely it is that words $x^*$ and the words 84$a$-$n$ which contain the stem q do match. The value of $p_2(H)(x^*,q)$ calculated by using this equation will tend to increase if the distribution of the words $x^*$ and the words 84$a$-$n$ which contain the stem q throughout the document is such that those words occur more frequently in the same segment as each other; if the number of times that the words $x^*$ and the words 84$a$-$n$ which contain the stem q occur in the same segment as each other is higher in comparison to the total number of times that they occur or if the stem q is longer; but will tend to reduce if there is a greater difference between the total numbers of times that the words $x^*$ and the words 84$a$-$n$ which contain the stem q occur in their respective documents.

The highest and the second-highest values of $p_2(H)(x^*,q)$ calculated for possible stems q are stored, along with a record of the stems q for which those values were calculated. These stems are designated $q'$ and $q''$ respectively and the highest and the second-highest values of $p_2(H)(x^*,q)$ are designated $p_2(H)(x^*,q')$ and $p_2(H)(x^*,q'')$ respectively. The words containing the stem q are assumed to be the most likely of the remaining words in the target word list with stems common to the word $y_1'$ to match word $x^*$.

If the value of $p_2(H)(x^*,q')$ is the same as the value of $p_2(H)(x^*,q'')$ then it is assumed that no more words which match the word $x^*$ may currently be decided upon by processing of Element 3. Processing is therefore transferred to Element 4 in order that more words which match the word $x^*$ may be located.

Otherwise, the words 84$a$-$n$ containing the stem $q'$, the words with which the word $x^*$ was paired to give the highest value of $p_2(H)(x^*,q')$, are assumed to match the word $x^*$ and therefore those words need no-longer be included in processing directed to the finding of matches where their occurrences in the target document correspond to an occurrence of the word $x^*$ in the source document, i.e. where the lists of segment numbers 67$aa$-$nn$ and 87$aa$-$nn$ corresponding to the word $x^*$ and the words 84$a$-$n$ containing the stem $q'$ respectively both contain a particular segment number. Therefore, for the positions in the source document 60 and the target document 80 where such a correspondence occurs, the words $x^*$ and the words 84$a$-$n$ containing the stem $q'$ which are in correspondence are deleted from the source word occurrence set 65 and then the target word occurrence set 85 and the source word list 63, the target word list 83, the source word frequency list 68 and the target word frequency list 88 are updated accordingly:

the value stored in the record 69$a$-$n$ corresponding to the word $x^*$ is decremented by 1 for each word $x^*$ which is deleted;

if each occurrence of the word $x^*$ in a particular segment 61$a$-$n$ has been found to correspond with a word from the target document then the number of that segment is deleted from the source word occurrence list 66$a$-$n$ corresponding to the word $x^*$;

if the value stored in the record 69$a$-$n$ corresponding to the word $x^*$ is now zero then the word $x^*$ is deleted from the source word list 63;

the value stored in the record 89$a$-$n$ corresponding to each word 84$a$-$n$ which is deleted is decremented by 1 for each word 84$a$-$n$ which is deleted;

if each occurrence in a particular segment 81$a$-$n$ of a word 84$a$-$n$ which is deleted has been found to correspond with a word from the target document then the number of that segment is deleted from the target word occurrence list 86$a$-$n$ corresponding to that word 84$a$-$n$; and if the value stored in the record 89$a$-$n$ corresponding to a word 84$a$-$n$ which is deleted is now zero then that word is deleted from the target word list 83.

If any characters occur before or after the stem q in a word 84$a$-$n$ which has been deleted then a morpheme table 70, which is shown in FIG. 2, is amended. The morpheme table 70 consists of: a prefix list 71 which is a list of prefixes 72$a$-$n$; a prefix frequency list 73 which is a list of the numbers of times that each prefix 72$a$-$n$ has been found to occur 74$a$-$n$; a suffix list 75 which is a list of suffixes 76a-n; and a suffix frequency list 77 which is a list of the numbers of times that each suffix 76a-n has been found to occur 78a-n. If any characters occur before the stem q in a word 84a-n which is deleted then these are assumed to represent a prefix and are denoted by $y^p$; a search is made for the prefix $y^p$ in the prefix list 71 and if it is found not to be in that list then the prefix $y^p$ is added to the prefix list 71 and the record of the number of times that that prefix has been found to occur is amended by incrementing by 1 the record 74a-n corresponding to the prefix $y^p$ (or by setting that record to 1 if the prefix $y^p$ had not previously been found). If any characters occur after the stem q in a word 84a-n which is deleted then these are assumed to represent a suffix and are denoted $y^s$; a search is made for the suffix $y^s$ in the suffix list 75 and if it found not to be in that list then the suffix $y^s$ is added to the suffix list 75 and the record of the number of times that that suffix has been found to occur is amended by incrementing by 1 the record 76a-n corresponding to the suffix $y^s$ (or by setting that record to 1 if the suffix $y^s$ had not previously been found). The results table 90 shown in FIG. 3 is also updated to take account of the newly located matches by the addition of a row of data to that table for each word 84a-n which is deleted, the row containing:

a serial number allotted to the present pairing of words $x^*$ and the word 84a-n which is deleted (stored in column 91);

the word $x^*$ (stored in column 92);

the word 84a-n which is deleted (stored in column 93);

the parsing (i.e. the division into prefix, stem and suffix) currently assumed to apply to the word 84a-n which is deleted (stored in column 94) (the word will be assumed to be divided into the prefix $y^p$, suffix $y^s$ and stem q, as described above);

a list of the segments in the source document in which occurrences of the word $x^*$ have been found to match the word 84a-n which is deleted (stored in column 95);

a list of the segments in the target document in which occurrences of the word 84a-n which is deleted have been found to match the word $x^*$ (stored in column 96);

the total number of matched pairs of the words $x^*$ and the word 84a-n which is deleted (stored in column 97); and a flag record indicating whether or not the parsing stored in column 94 of the present row has been updated, currently set so as to show that it has not been updated (stored in column 98).

ELEMENT 4

To locate more words which match the word $x^*$, use is made of the hypothesis that—in general—where a group of consecutive characters in a word is conjectured to be a stem, the more frequently that the characters before that possible stem are thought to occur as a prefix or the more frequently that the characters after that possible stem are thought to occur as a suffix then the more likely it is that that possible stem is, in fact, the true stem of the word. This may be used to refine the algorithm employed in Element 3. For example, the words "CURING" and "SCURVY" both have the same group of three consecutive letters ("CUR") in common with the word "CURED". The group of letters "CUR" would be assumed to be the stem common to all these words so the word "CURING" would be assumed to be composed of the stem "CUR" followed by the suffix "-ING" and the word "SCURVY" would be incorrectly assumed to be composed of the prefix "S-" followed by the stem "CUR" and the suffix "-VY". Because "-ING" is a more common affix than are "S-" and "-VY", "CURING" would be correctly assumed to be more likely to be 'related' to "CURED" than would "SCURVY".

If any words $x^*$ remain unmatched then, referring again to FIG. 2, each remaining word 84a-n from the target document is taken in turn and is paired with the word $x^*$. For each pairing of the word $x^*$ and a word from the target document designated y, the following values are determined:

$m(x^*,y)$—the number of times that the word $x^*$ and the word y occur in corresponding segments 61a-n and 81 a-n in the source and target documents 60 and 80 (this may be determined by a comparison of the lists of segment numbers 66aa-nn and 88aa-nn corresponding to each word);

$S_x$—the number of times that word $x^*$ occurs in the source document 60 (this is stored in the record 69a-n corresponding to the word $x^*$);

$T_y$—as defined in Element 2;

L—the length of the longest group of consecutive characters common to both word y and to the word $y_1'$ identified previously as the most probable match for word $x^*$ and stored in the temporary match store 50;

$f_1$—the number of times that the prefix of the word y (that section of the word y occurring before the stem) has been found to occur (this is stored in the record 74a-n corresponding to the prefix of the word y); and $f_2$—the number of times that the suffix of the word y (that section of the word y occurring after the stem) has been found to occur (this is stored in the record 78a-n corresponding to the suffix of the word y);

and a revised representation of the likelihood that word $x^*$ and word y match, $p_3(H)(x^*,y)$, is calculated by using the equation shown in FIG. 13.

The form of this equation has been chosen so that—in general—the value of $p_3(H)(x^*,y)$ will tend to give an indication of the likelihood that the words $x^*$ and y match; $p_3(H)(x^*,y)$ being—in general—greater the more likely it is that the words $x^*$ and y do match. The value of $p_3(H)(x^*,y)$ calculated by using this equation will tend to increase if the distribution of the words $x^*$ and y throughout the document is such that those words occur more frequently in the same segment as each other; if the number of times that the words $x^*$ and y occur in the same segment as each other is higher in comparison to the total number of times that they occur; if the longest group of consecutive characters common to the word y and to the word $y_1'$ is longer; or if the groups of characters before or after that group of consecutive characters have been found to occur more frequently; but will tend to reduce if there is a greater difference between the total numbers of times that the words $x^*$ and y occur in their respective documents.

The highest and the second-highest values of $p_3(H)(x^*,y)$ found are stored, along with a record of the words in the target document which were included in the pairings for which those values were calculated. These words are designated $y_3'$ and $y_3''$ respectively and the highest and the second-highest values of $p_3(H)(x^*,y)$ are designated $p_1(H)(x^*,y_3')$ and $p_3(H)(x^*,y_3'')$ respectively. Word $y_3'$ is assumed to be the most likely of the remaining words in the target document to match word $x^*$.

If the value of $p_3(H)(x^*,y_3')$ is the same as the value of $p_3(H)(x^*,y_3'')$ then it is assumed that no further matches for $x^*$ may currently be decided upon. Processing is therefore transferred to Element 2 in order that another word from the source document 60 may be chosen as word $x^*$.

Otherwise, the word $y_3'$, the word with which $x^*$ was paired to give the highest value of $p_3(H)(x^*,y)$, is assumed to match the word $x^*$ and therefore the word $y_3'$ need no-longer be included in processing directed to the finding of matches where its occurrence in the target document corresponds to an occurrence of the word $x^*$ in the source document, i.e. where the word $x^*$ and the word $y_3'$ occur in segments having the same segment numbers in the source and target documents respectively. Therefore, for the positions in the source document 60 and the target document 80 where such a correspondence occurs, the corresponding words $x^*$ and $y_3'$ are deleted from the and the source word occurrence set 65 and from the target word occurrence set 85 and the source word list 63, the target word list 83, the source word frequency list 68 and the target word frequency list 88 are updated accordingly:

the value stored in the record 69$a$–$n$ corresponding to the word $x^*$ is decremented by 1 for each word $x^*$ which is deleted;

if each occurrence of the word $x^*$ in a particular segment 61$a$–$n$ has been found to correspond with a word from the target document then the number of that segment is deleted from the source word occurrence list 66$a$–$n$ corresponding to the word $x^*$;

if the value stored in the record 69$a$–$n$ corresponding to the word $x^*$ is now zero then the word $x^*$ is deleted from the source word list 63;

the value stored in the record 89$a$–$n$ corresponding to the word $y_3'$ is decremented by 1 for each word $y_3'$ which is deleted;

if each occurrence of the word $y_3'$ in a particular segment 81$a$–$n$ has been found to correspond with a word from the target document then the number of that segment is deleted from the target word occurrence list 86$a$–$n$ corresponding to the word $y_3'$; and if the value stored in the record 89$a$–$n$ corresponding to the word $y_3'$ is now zero then the word $y_3'$ is deleted from the target word list 83.

If any characters occur before or after the stem in the word $y_3'$ (which stem was located during the calculation of the value of L for the word $y_3'$) then the morpheme table 70 is amended. If any characters occur before the stem in the word $y_3'$ then they are assumed to represent a prefix and are denoted by $y^p$. A search is made in the prefix list 71 for the prefix $y^p$. If a prefix identical to $y^p$ is found there then the record of the number of times that that prefix has been found to occur is amended by incrementing by 1 the record 74$a$–$n$ corresponding to the prefix $y^p$. If a prefix identical to $y^p$ is not found in the prefix list 71 then the prefix $y^p$ is added to the prefix list 71; the record of the number of times that that prefix has been found to occur (the record 74$a$–$n$ corresponding to the prefix $y^p$) is set to 1; and a search is made in the prefix list 71 for prefixes which consist of the first characters of prefix $y^p$. If any such prefixes are found to have occurred then the words listed in column 92 of the results table 90 in which each such prefix occurred are taken in turn and if a statistically significant number of them begins with the characters of prefix $y^p$ then it is assumed that the previous assessment of its prefix was incorrect; its prefix is assumed to be $y^p$; and therefore the parsing previously stored in column 92 of the results table 90 for each of those words is altered to give $y^p$ as the prefix; the corresponding flag in column 98 of the results table 90 is set to indicate that that pairing has been updated in the morpheme table 70 the record of the number of times that the prefix $y^p$ has been found to occur (the record 74$a$–$n$ corresponding to the prefix $y^p$) is incremented by 1 and the record 74$a$–$n$ corresponding to the previously assessed prefix is decremented by 1. For example, if the word "UNDERTOW" had been assumed to have the prefix "UN-" and the stem "DERTOW" then when a word whose prefix was assumed to be "UNDER-" was located the word "UNDERTOW" would be re-assessed and would then be assumed to have the prefix "UNDER-" and the stem "TOW".

If any characters occur after the stem in the word $y_3'$ then they are assumed to represent a suffix and are denoted $y^s$. A search is made in the suffix list 75 for the suffix $y^s$. If a suffix identical to $y^s$ is found there then the record of the number of times that that suffix has been found to occur is amended by incrementing by 1 the record 74$a$–$n$ corresponding to the suffix $y^s$. If a suffix identical to $y_3$ is not found in the suffix list 75 then the prefix $y^s$ is added to the prefix list 75, the record of the number of times that that suffix has been found to occur (the record 78$a$–$n$ corresponding to the suffix $y^s$) is set to 1; and a search is made in the suffix list 75 for suffixes which consist of the final characters of suffix $y^s$. If any such suffixes are found to have occurred then the words in which each such prefix occurred are taken in turn and if a statistically significant number of them ends with the characters of suffix $y^s$ then it is assumed that the previous assessment of its suffix was incorrect; its suffix is assumed to be $y^s$; and therefore the parsing previously stored in column 92 of the results table 90 for each of those words is altered to give $y^s$ as the suffix; the corresponding flag in column 98 of the results table 90 is set to indicate that the parsing has been updated and in the morpheme table 70 the record of the number of times that suffix $y^s$ has been found to occur (the record 74$a$–$n$ corresponding to the suffix $y^s$) is incremented by 1 and the record 78$a$–$n$ corresponding to the previously assessed suffix is decremented by 1. The results table 90 is also updated to take account of the newly located match by the addition of a row of data to that table, the row containing:

a serial number allotted to the present pairing of words $x^*$ and $y_3'$ (stored in column 91);

the word $x^*$ (stored in column 92);

the word $y_3'$ (stored in column 93);

the parsing (i.e. the division into prefix, stem and suffix) currently assumed to apply to the word $y_3'$ (stored in column 94) (the word will be assumed to be divided in the prefix $y^p$, suffix $y^s$ and stem as described above);

a list of the segments in the source document in which occurrences of the word $x^*$ have been found to match the word $y_3'$ (stored in column 95);

a lot of the segments in the target document in which occurrences of the word $y_3'$ have been found to match the word $x^*$ (stored in column 96);

the total number of matched pairs of words $x^*$ and $y_3'$ (stored in column 97);

a flag record indicating whether or not the parsing stored in column 94 of the present row has been updated, currently set so as to show that it has not been updated (stored in column 98).

Processing of Element 4 is then repeated in order that more words which match the word x* may be located.

ELEMENT 5

Any words remaining in the source word list 63 or the target word list 83, being words still unmatched after recursive processing of Elements 2, 3 and 4, may be tentatively assumed to have been erroneously translated. In order that they may be assessed by a linguist who might correct any errors in the translation of the documents, these words are transmitted for display to the output unit 5. For convenience, the words which, in the original document, surrounded the remaining words may also be transmitted for display since they would allow the linguist to judge more accurately the context of each remaining word.

If it is desired to produce a basis of a bilingual dictionary or to check that the method has been performed satisfactorily then a list of the pairs of words which have been found to match may be transmitted for display to the output unit 5.

At any part during the processing of the method, the matched words may be assessed in order to locate "semantic domains". This may be done by performing the method using the set of matched target words as a source document and the set of matched source words as a target document. For example, in a source document written in English, the words "BIG" and "LARGE" may occur. These may be in a semantic domain with the words "GRAND" and "GROS" in a French target document. During the processing of the method it may be found that "BIG" is matched to some occurrences of "GRAND" and of "GROS" and that "LARGE" is matched to other occurrences of "GRAND" and of "GROS". When the matched sets are transposed as described above, it will be found that "GRAND" is matched to some occurrences of "BIG" and of "LARGE" and that "GROS" is matched to some occurrences of "BIG" and of "LARGE". By comparing the patterns of the matched words, it would be found that the four words form a semantic domain.

If it is desired to verify the results of the method then the initial documents may be transposed and the method repeated: copies of the initial source document and the initial target document may be stored as the target document 80 and the source document 60 and the entire method as described above may then be performed for a second time. The results of the first and the second performances of the method may then be compared in order to judge their accuracy.

It will be appreciated that more accurate results will be produced if the initial sizes of the source and target documents is larger. The method is therefore particularly suitable for application to long documents, for example, the text of The Bible.

I claim:

1. A method of processing a first text document in a source language and a second text document in a target language using a computer, each of the documents being divided into segments and stored in memory means of the computer, the segments being further divided into words, the method comprising carrying out the steps of:
   a) selecting a first word in the first text document and a second word in the second text document and determining a representation of the probability that the first and second words have substantially the same meaning by taking into account the result of a comparison of the distribution of the first and second words in the segments of the first text document and the second text document respectively; and
   b) determining that the first and second words have substantially the same meaning when the representation of the probability that the first and second words have the same meaning is greater than a threshold.

2. A method as claimed in claim 1, wherein the first word in the first text document is regarded to have substantially the same meaning as the second word in the second text document if:
   a) the representation of the probability of having substantially the same meaning as the first word in the first text document is greater for the second word in the second text document than for any other word in the second text document;
   b) the ratio of the greatest representation of the probability of having substantially the same meaning as a word in the second text document to the next greatest such representation is greater for the first word in the first text document than for any other word in the first text document; and
   c) that ratio is greater than one.

3. A method as claimed in claim 1 or claim 2, wherein each segment in the first text document corresponds to a single segment in the second text document and the representation of the probability that the first word in the first text document and the second word in the second test document have substantially the same meaning is determined by a process comprising determining the number of time that words identical to the first word are found in segments in the first text document which correspond to segments in the second text document containing words of the same form as the second word.

4. A method as claimed in claim 3, wherein a word is of the same form as the second word only when a word is identical to the second word.

5. A method as claimed in claim 3, wherein a word is of the same form as the second word when the word has a group of at least one or more consecutive letters in common with the second word, and the process also comprises determining the length of the group of letters.

* * * * *

UNITED STATES PATENT AND TRADEMARK OFFICE
CERTIFICATE OF CORRECTION

PATENT NO. : 5,323,310
DATED : June 21, 1994
INVENTOR(S) : David W.C. Robinson

It is certified that error appears in the above-identified patent and that said Letters Patent is hereby corrected as shown below:

Column 1, line 13, after "words" insert --in--.

Column 3, line 16, before "God" strike the double quotation mark ("); line 17, before "I" strike the single quotation mark (') and substitute therefor --"--; line 18, after "you." strike the single quotation mark and substitute therefor a double quotation mark --"--; line 19, before "Get" strike the single quotation mark (') and substitute therefor --"--; line 21, after "travel!" strike the single quotation mark ('); line 25, after the period (".") insert a double quotation mark --"--; line 37, after the period (".") insert a double quotation mark --"--; line 38, before "I" insert a double quotation mark --"--; line 54, "kut" should read --kuti--; line 65, "chinall" should read --chinali--.

Column 4, line 8, "Galllea" should read --Galilee--; line 56, after "list" insert --66a-n corresponding to that word if the word had not--.

Column 5, line 18, after "being" insert --all--.

Column 7, line 11, "IN" should read --TO--; line 13, "p(H)(x,y)" should read --$p_1(H)(x,y)$--; line 32, "$(x,y_1')$" (second occurrence) should read --$(x,y_1")$--.

Column 11, line 3, after "occur" insert --in--.

Column 12, line 26, "both" should read --the--.

UNITED STATES PATENT AND TRADEMARK OFFICE
CERTIFICATE OF CORRECTION

PATENT NO. : 5,323,310
DATED : June 21, 1994
INVENTOR(S) : David W.C. Robinson It is certified that error appears in the above-identified patent and that said Letters Patent is hereby corrected as shown below:

Column 13, line 19, after "from" and before "the source" strike "the and".

Column 16, line 42, "test" should read --text--; line 44, after "of", "time" should read --times--.

Signed and Sealed this

First Day of November, 1994

Attest:

Attesting Officer

BRUCE LEHMAN

Commissioner of Patents and Trademarks